United States Patent
Brassea-Flores

Patent Number: 5,899,066
Date of Patent: May 4, 1999

[54] BUOYANCY AND THERMAL DIFFERENTIALS ENERGY GENERATOR

[76] Inventor: Angel Brassea-Flores, P.O. Box 2186, Calexico, Calif. 92232

[21] Appl. No.: 08/841,691

[22] Filed: Apr. 30, 1997

Related U.S. Application Data

[62] Division of application No. 08/491,291, Jun. 12, 1995, Pat. No. 5,685,147.

[51] Int. Cl.$^6$ ........................................................ F03G 7/00
[52] U.S. Cl. ................................................................ 60/496
[58] Field of Search ........................................ 60/495, 496

[56] References Cited

U.S. PATENT DOCUMENTS 5,005,357   4/1991   Fox ............................................. 60/495

FOREIGN PATENT DOCUMENTS 347008   2/1905   France ...................................... 60/496

Primary Examiner—Noah P. Kamen

[57] ABSTRACT

A system for extracting useful energy from two masses of matter having polarized hot and cold temperatures operates in its primary embodiment with a looped circulation passageway having a condensing phase, an expansion phase and a working generally gaseous fluid that circulates through the loop. The expansion phase of the gas contains a relatively standing liquid through which the working gas, which is injected at the bottom, is allowed to buoy up to drive gas pressure turbines and principally a flotation turbines (floturbines).

The rest of the loop defines a return path which includes the condensing phase in which the expanded gas from the end of the last turbine is condensed to either a denser gas or to a liquid, and re-injected into the bottom of the condensation phase again, in a continuous cycle. Net energy output is achieved by heating the vertical expansion phase side of the loop with heat from the high temperature source to further expand the working gas and thereby increase the power that it delivers to the turbines, while using the cold temperature source to cool the working fluid in the condensing side, reducing the energy for reinjection.

27 Claims, 9 Drawing Sheets

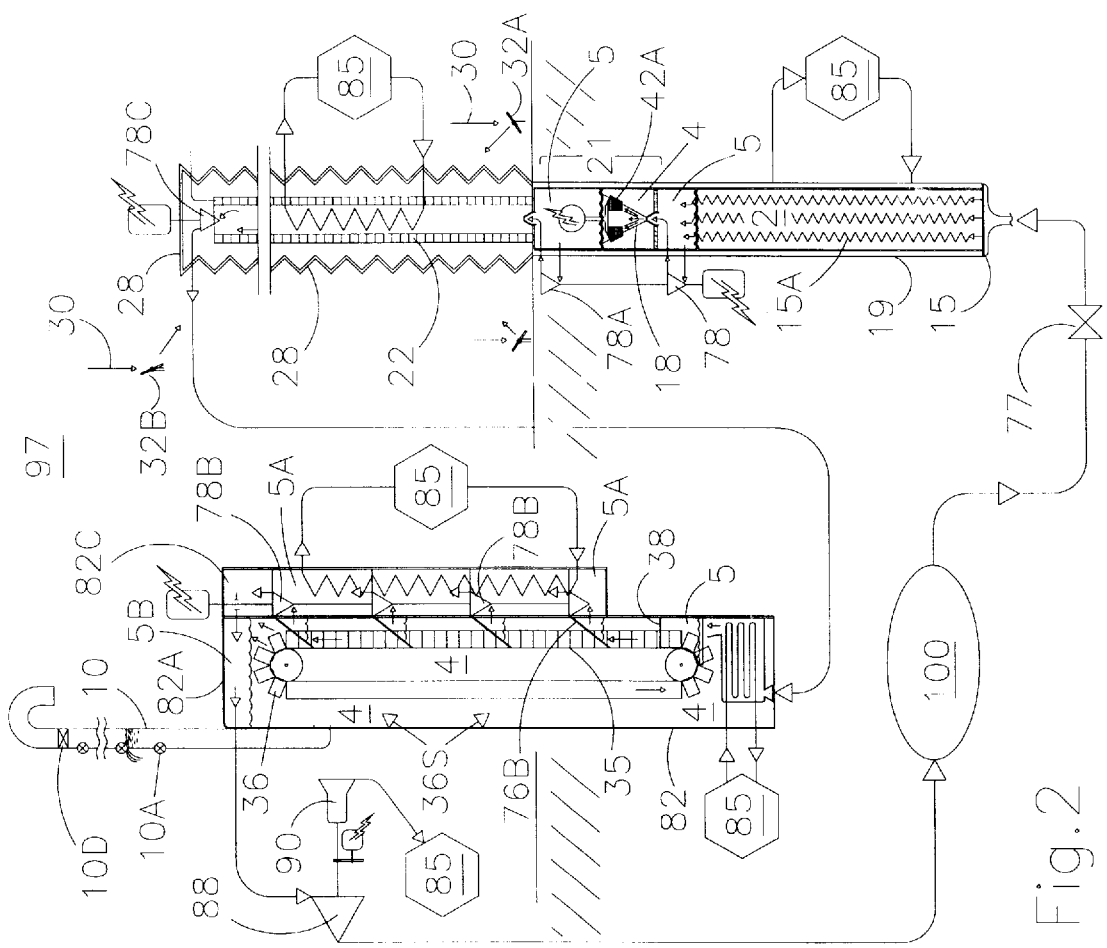
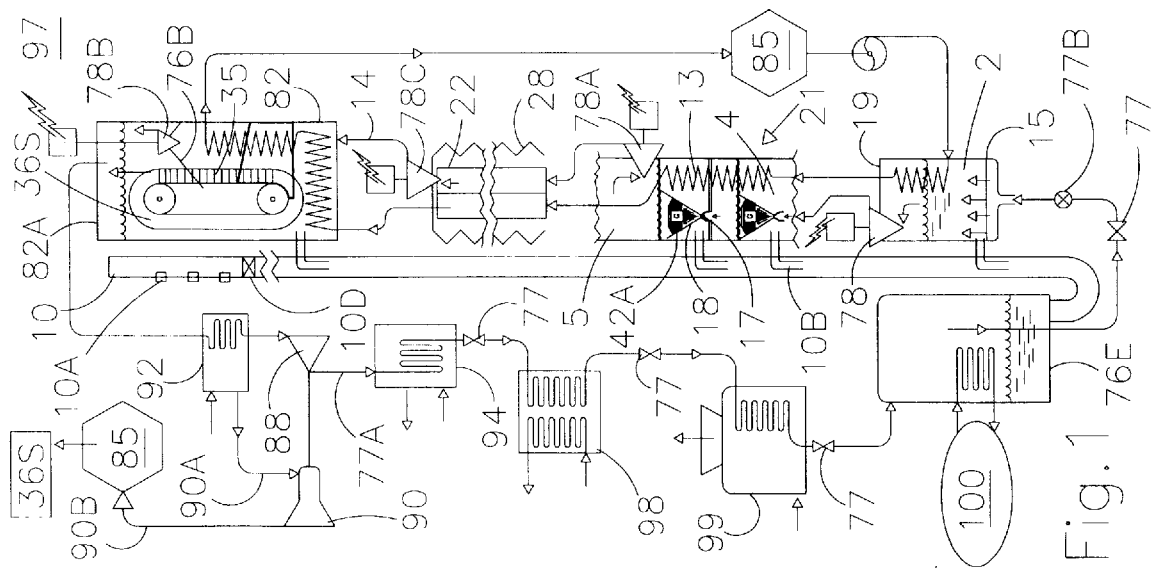
Fig. 2
Fig. 1

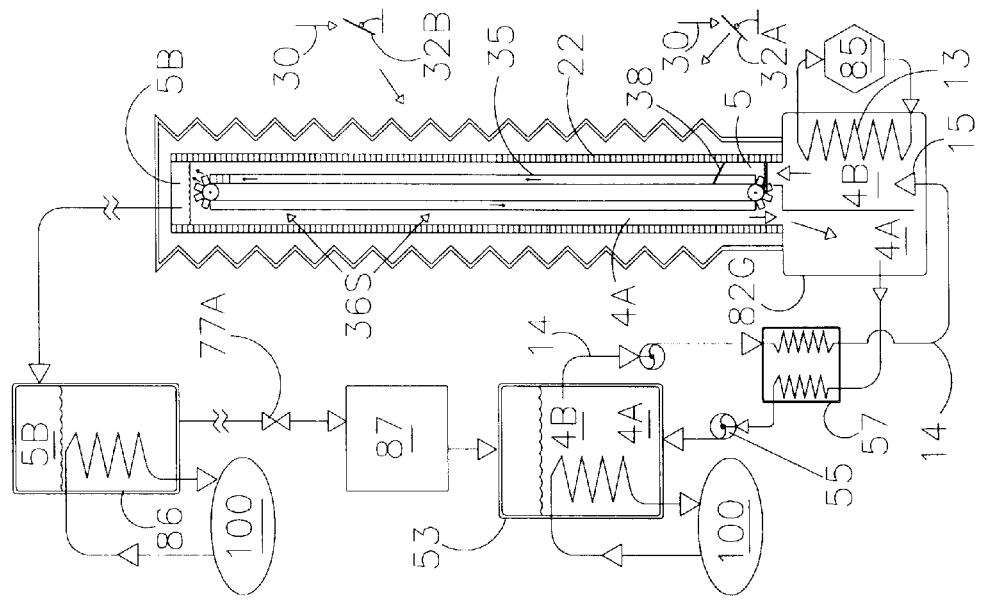
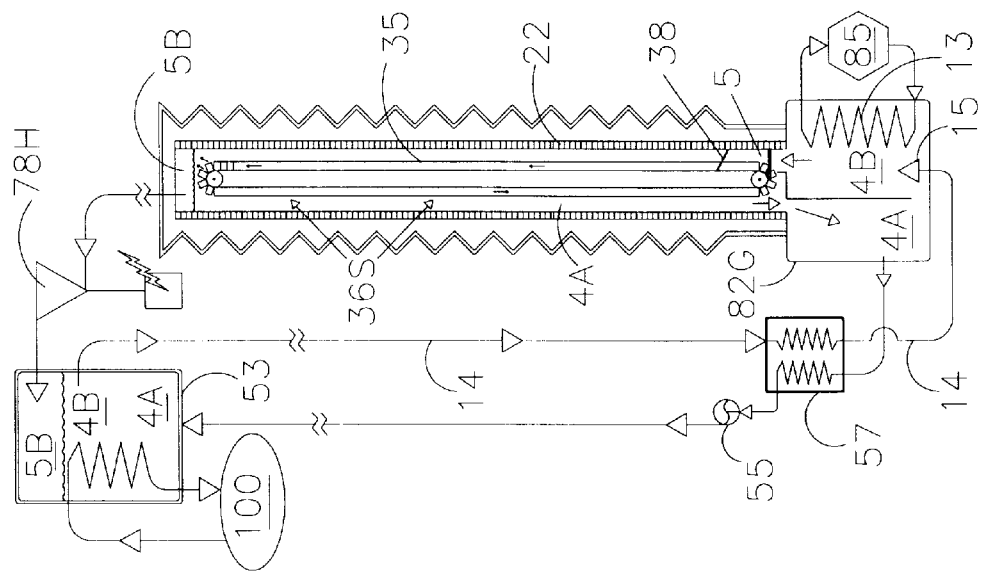
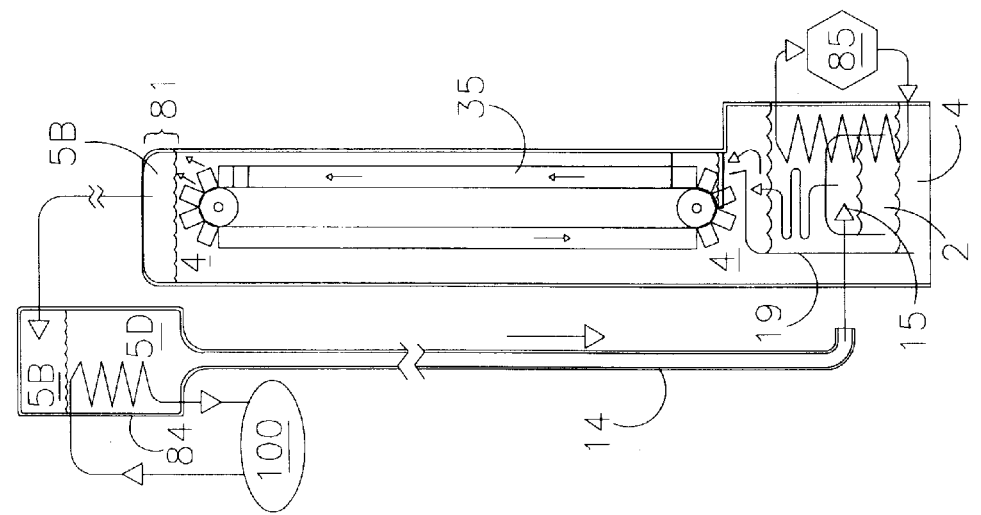

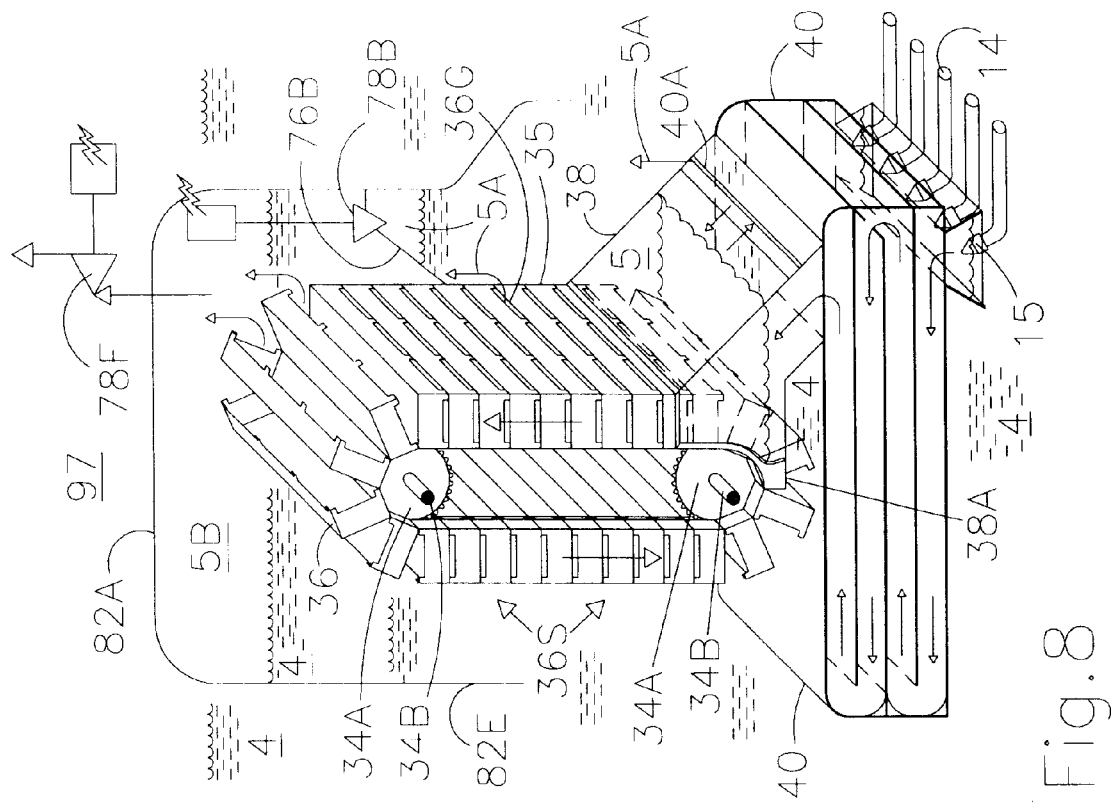
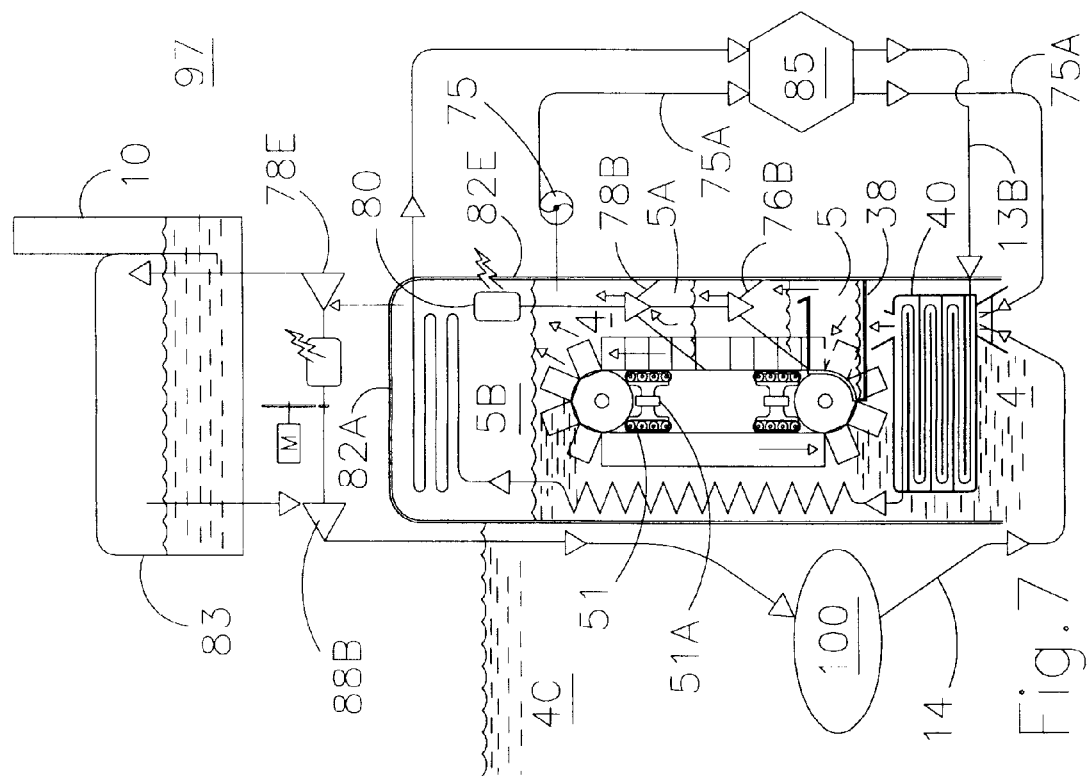

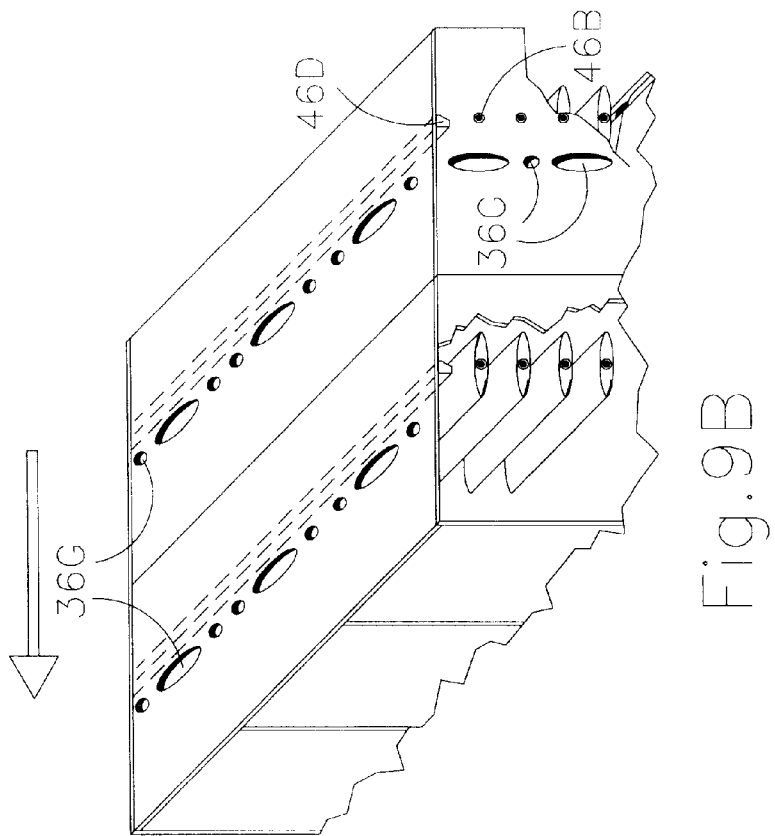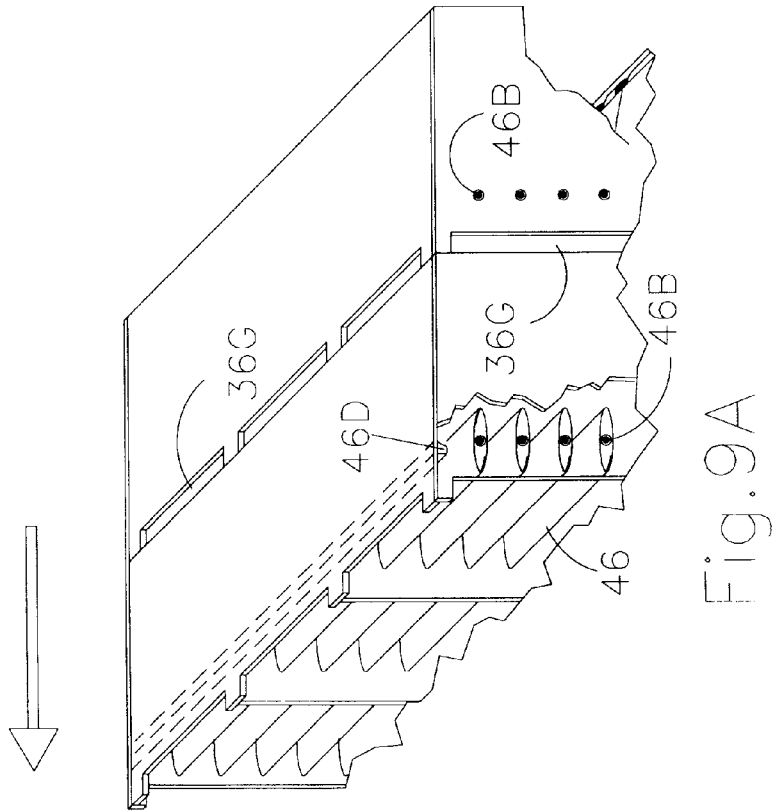

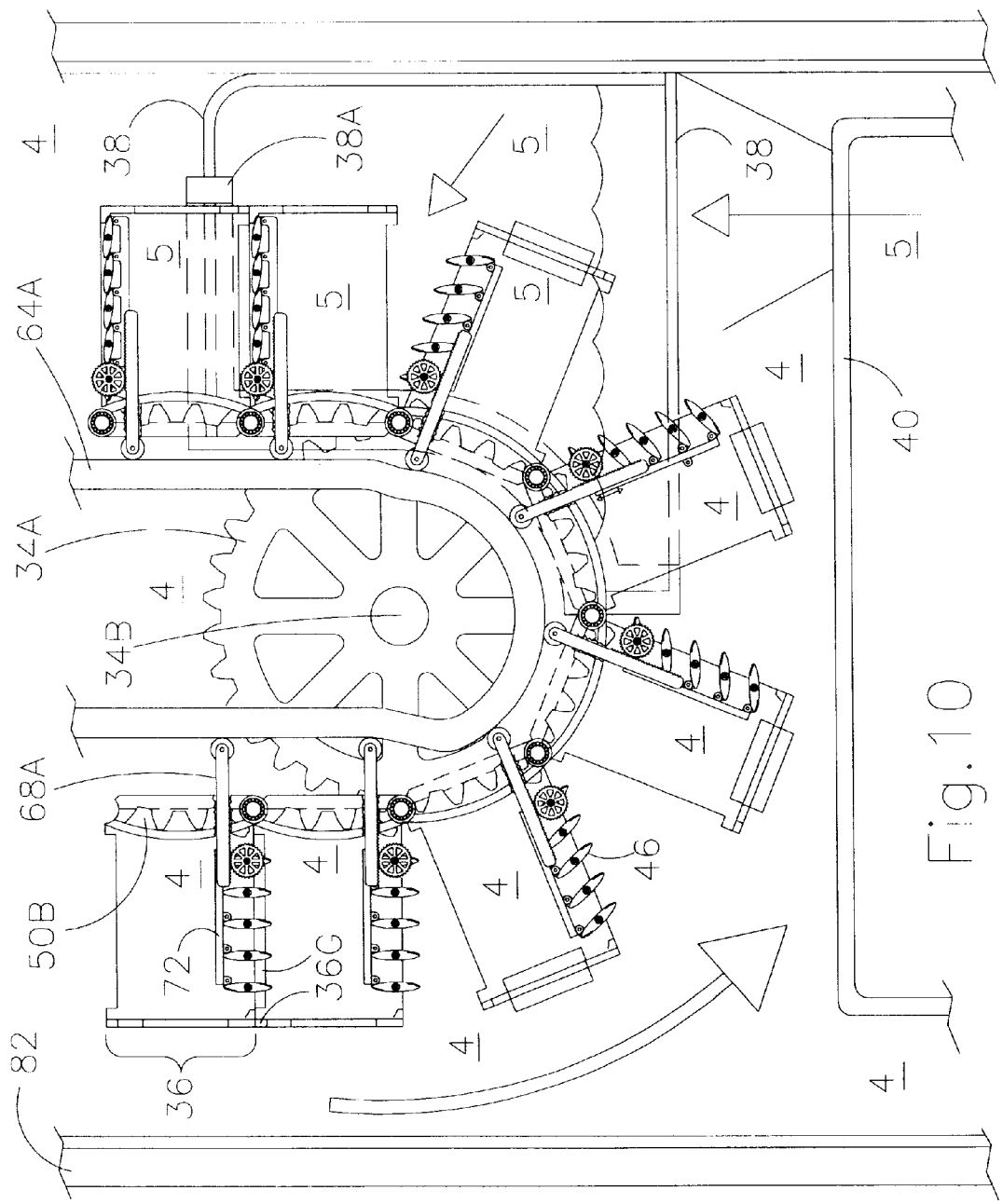

BUOYANCY AND THERMAL DIFFERENTIALS ENERGY GENERATOR

This is a division of Ser. No. 08/491,291 filed Jun. 12. 1995, now U.S. Pat. No. 5,685,147.

BACKGROUND OF THE INVENTION

There are many different kinds of specialized generators for extracting energy from nature one way or another, including tidal generators, ocean current, wave, and temperature differential generators, lightening generators, waterfall generators, and even a gyro generator.

All of these apparatuses are specialized in their requirements for an energy source, some relying on hot water from thermal wells, others needing a 20-foot tide differential. Current generators require water currents, wave generators require waves, and so forth.

However, one source of energy that is virtually universal is the temperature differential. Geothermal heat, solar heat, waste combustion exhaust gas, industrial heat discarded as a by-product, etc. are sources of thermal differentials when paired specifically with lower temperature sources as cool ocean or river currents or even with wind. Stratified ocean layers, and night/day differentials in deserts offer energy opportunities. All that is needed to produce energy, aside from a mechanism to do it, is a temperature differential between two masses as set out in the second law of thermodynamics.

A government effort dubbed "OTEC", for "Ocean Thermal Energy Conversion" has achieved limited success with ocean thermal differentials, reaching at least break-even outputs, which is rather impressive considering the limitation on efficiency predicted by the second law of thermodynamics based on the relatively narrow temperature spread. Nonetheless this system is based on the continuous availability of the hot and cold temperature sources and as a very large fixed plant, no doubt must be worked all the time to have a hope of breaking even commercially.

There is a need for a versatile energy producing system buildable for one or more houses or cities capable of taking advantage of these limitless polarized temperature combinations to efficiently produce clean, competitive energy from mixed and erratic sources. Along these lines little attention has been paid to the use of buoyancy generators, especially in regard to their use transducing energy from thermal differentials. Buoyancy wheels or turbines have been suggested for limited applications in which gas is escaping from the sea floor, but have not been considered realistic for generalized transduction of thermal energy, which would require the creation of a man-made bubble path for a circulating gas.

Examples of buoyancy wheels are shown by U.S. Pat. No. 4,363,212, issued Dec. 14, 1982, and another example is shown in U.S. Pat. No. 4,981,015 issued Jan. 1, 1991. Both disclose flotation wheels whose design requires more energy input than the output energy they would yield, relying on a nondisclosed source of flotation energy having no creation cost.

SUMMARY OF THE INVENTION

The invention establishes a system which uses any adequately polarized pair of high and low temperature sources to produce net output energy. This is accomplished by creating a passageway in which a working generative fluid or gas is circulated. In the passageway the gas is energized by mechanical pressurization and/or at least by exposure to heat from the high temperature sources. Downstream energizing the generative fluid, one part of the passageway is a generative section including a substantially vertical riser containing a relatively standing liquid through which the gas rises and drives at least a flotation turbine or floturbine. Within the generative section, the gas expands through turbines for energy transduction. The heating produces more lift for the buoyancy-powered operative turbines and more conventional pressure (later explained) for conventional gas/vapor pressure turbines and thereby the system essentially turns heat energy into rotational energy. The cold temperature source is used for condensing the working gas downstream the mentioned turbines for almost costless re-circulation of the generative fluid. The condensation is preferably co-generative and better if transducing both pressures: buoyancy, and conventional pressures produced by the heat being removed.

The circulating generative fluid can be a liquid or a gas and is gaseous for most, if not all of the cycle; if a gas, possibly being converted to a liquid briefly for injection into the impelling liquid. Once the gas is introduced into the generative section it expands and buoys responding to its density lower than the density of the impelling liquid. Within the liquid, the generative fluid can be directed to form the helical flow and/or only a vertical buoyancy column. Hence, the buoyancy can be transduced by vortex turbines, floturbines of closable tube segments and/or gas/vapor conventional turbines. The gas/vapor conventional turbines transduce buoyancy pressure, and/or conventional pressures generated above the liquid before the condensation and re-circulation of the gas. Some embodiments can release it into atmosphere if it is working air with worthless amount of heat. Atomized water can be controllably graduated as mixed with the pressurized gas to enhance "touch" on the turbine blades of conventional gas/vapor pressure turbines when used simultaneously with floturbines transduction.

The system does not depend on any particular size, elements or temperature range. The floturbine of the system can work from a very small temperature differential between said high and low temperature differentials. The system also can work at high or low speeds and in essence, can work at whatever temperatures and quantities the energy and generative fluid can be utilized in the system. In this regard, it is flexible and substantially universal in its applicability.

BRIEF DESCRIPTION OF THE DRAWINGS

FIG. 1 is a diagrammatic view of the generator showing the circulation passageway with the gas expansion and the condensation phases on the respective right and left sides;

FIG. 2 is a diagrammatic view of the system using a partially under-surface heating stack and a floturbine assisted by gas spillways positioned in an adjacent chamber;

FIG. 2A is a simplified diagrammatic view of the system showing an enclosed floturbine using gravity flow for injection of liquefied working fluid into the column of standing water;

FIG. 2B is a diagrammatic view of the system showing a floturbine enclosed by a surface multi source heat and solar collector insulated by a transparent cover and showing a method of transduction using absorption for re-circulation of generative fluid;

FIG. 2C is similar to FIG. 2B with the addition of a condenser and an evaporator for refrigeration as additional feature of the system;

FIG. 7 is a diagrammatic view of the system submerged in water principally showing a top heat pressurizing chamber, open bottom enclosure, a turbo generator in tandem with a compressor and a stretchable atmospheric pressure chamber;

FIG. 8 is a partial diagrammatic and perspective view of the system showing the floturbine, a generative fluid heater beneath same, transducers of gas spilled by the floturbine and a partial enclosure trapping and pressurizing the gas;

FIG. 9A is a partial perspective view of two coupled tube segments with louver gates and vents located at the front edges;

FIG. 9B is a partial perspective view of two coupled tube segments with louver gates and vents located between the front and back edges;

FIG. 10 is a sectional view of the tube segments turning around the lower rotor illustrating gas feeding from a hood, and an alternative gate-moving-arrangement; and, FIGS. 11A–D are enlarged views of the multi source heat collector 22.

DESCRIPTION

Figure 2E:
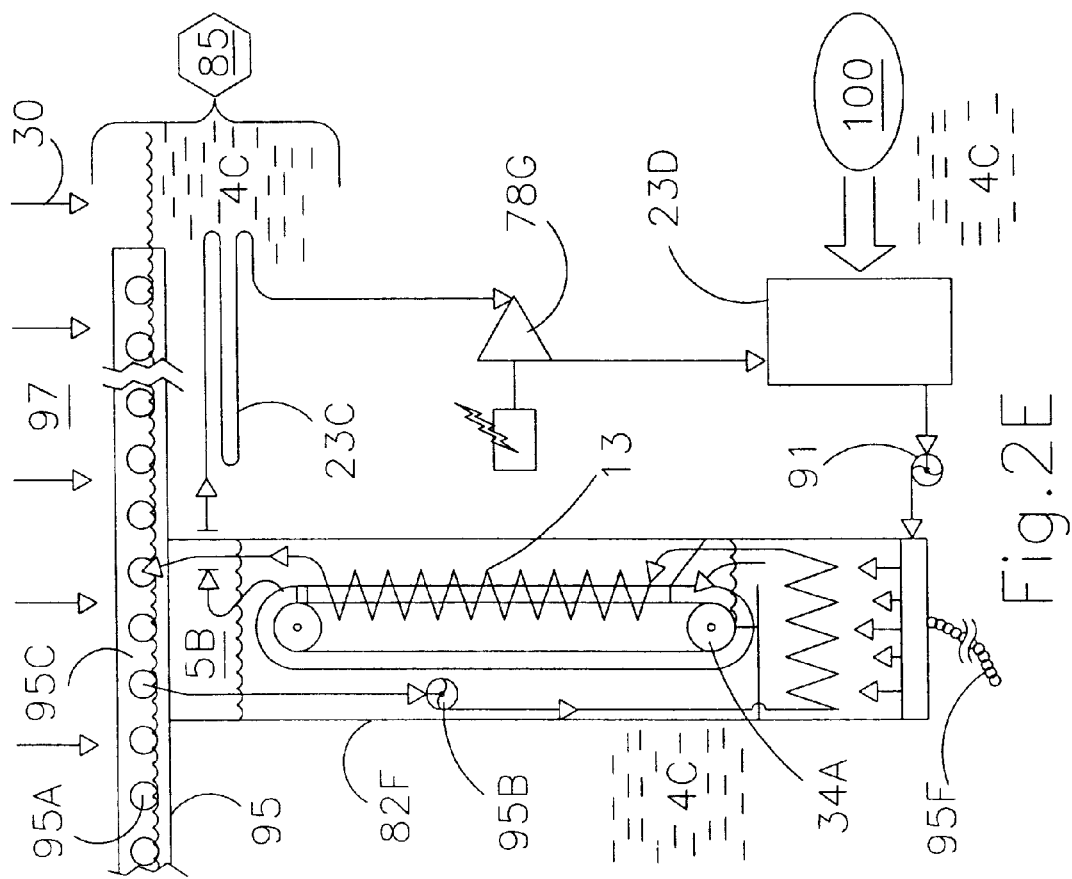
FIG. 2E is a diagrammatic view of the system suspended from a solar raft.

The system essentially relates to transduction or conversion of energy into another kind of energy (Webster's dictionary) particularly utilizing a working gas or generative fluid exited essentially by thermal differentials and circulating through a passageway that includes a liquid section which impels the generative fluid when rising therein.

Vertical Buoyancy pressure or Flotascension at least in this case is due to gravitational pressure of a displaced impelling liquid trying to occupy the site of the displacing generative fluid, according to Archemide's principle, with a force equal to the volume of liquid displaced by the generative fluid.

Vortex power is energy of generative fluid helically ejected and helically flotascending within the liquid 4. It is buoyancy-plus-rotation of generative fluid basically caused by axial uneven pressure, channeling or helical ejection of powered generative fluid within the liquid. Vortex power will subsequently be dubbed vortex power, helical buoyancy or helical power in the description and the claims. Vortex power is harnessed by vortex turbines 42A (later explained).

Conventional pressure in this description is defined as the pressure in every direction of (usually heated) gaseous generative fluid accumulated within fixed walls or barriers, in this case including as a wall the surface of the impelling liquid of a chamber 82 without pressure stretchability. Conventional pressure is different than helical pressure or vertical buoyancy pressures since for the last two there is a denser fluid impelling the generative fluid even if the generative fluid is not within the liquid.

The system utilizes gas/vapor turbines or artifacts which include state-of-the-art buoyancy operative turbines for converting into another energy form or transducing helical buoyancy pressure (or buoyancy-plus-rotation of generative fluid within the liquid), vertical buoyancy pressure and, downstream the liquid, gas/vapor conventional pressure using gas/vapor conventional turbines 78C–G. Helical buoyancy pressure is transduced by vortex turbines 42A (FIGS. 1, 2, 5) and vertical buoyancy pressure is transduced utilizing the conventional turbines and/or at least a flotation turbine or floturbine 34–36 of closable tube segments 36 in this embodiment having vents (all later explained).

A working generative fluid rising by flotation or flotascending within the impelling liquid 4 makes dynamic flotation; different from the static flotation of a piece of wood on the surface of a liquid. Flotascension has been noticed in convection currents, aerostatic balloons, bubbles rising in boiling water, children's balloons full of helium, etc.

The dynamic working fluid or generative fluid increases its pow+ LK{zer if exposed to heat. Helical (ascensional and rotational) buoyancy pressure is created by generative fluid flowing through directing nozzles indexed to shape a vortex within the liquid. For harnessing vertical flotascension, floturbines 34–36 having vents 36G (FIGS. 8–10) and for spilling generative fluid 5A can be assisted by gas/vapor conventional turbines 76B–78D (positioned sub-aqueously). Obviously, for same purpose and as in chambers 19, 82 (FIGS. 1, 2), gas/vapor conventional turbines 78, 78A, 78B, etc. assisted by chambering devices equal or resembling walls 76B, can substitute the floturbines 34–36.

Downstream the liquid 4, the generative fluid 5B can be captured in an upper space of chamber 82 (stretchable or not) which includes the surface of the impelling liquid.

If the liquid is fully and inflexibly enclosed by the chamber 82, the accumulated conventional pressure of generative fluid 5B would eventually explode the enclosure 82 (FIGS. 2A–C, 2E) unless it is released or channeled rather through gas/vapor conventional turbines 78A, 78B.

For condensation, the heat from the generative fluid is removed preferably by binary or Rankine cycles 98 which can use floturbines to harness energy even from the smallest temperature differentials. Downstream last condensation, the generative fluid is re-circulated through heating devices (as heat exchangers, solar collectors, combustion, turbo-combustion, etc.,) and turbines and/or at least partially stored under pressure in hydraulic stretchable chambers 76E, or can go out of the system. Excess of heat can be stored within chambers similar to stretchable chambers 76E. Condensation can be performed upstream and/or downstream the pressurization pro-exposition of the generative fluid to heating devices and to the liquid.

With reference principally to FIG. 1, the system takes advantage principally of generative fluid flowing within a liquid and comprises a working circulating generative fluid or gas flowing through a circulation route or passageway. The passageway may include the atmosphere for negligible temperature and pressure drop when air or other discardable fluid is being used as generative fluid. One direction around the passageway is established as the circulation direction. The generative fluid circulates downstream in this fluid flow direction and it is conveyed through several different stages, having different linking circulating vehicles basically including an impelling liquid 4 within a chamber, enclosure or reservoir 82, pipes, valves, ports, a pressurizing section, heating devices assisted by and/or including High Temperature Sources (HTS 85), vortex turbines 42A, floturbines 34–36, gas/vapor conventional turbines 78B for flotascensional pressure and conventional pressure and conventional gas/vapor turbines (subsequently dubbed conventional turbines in description and claims) for conventional pressure (pressure of gaseous fluid in all directions) of gaseous fluid (subsequently dubbed conventional pressure in description and claims), condensing devices including smaller heat-sensitive binary or Rankine systems and assisted by and/or including any Low Temperature Source (LTS 100).

The "reservoir" 82 could be anything from the sea bottom to a vertical totem-like cylinder, the functionality criterion being that it is established with a vertical height adequate to allow the floturbine to operate.

The floturbine 34–36 (better shown by FIGS. 8–10) is basically composed of a support structure which includes at least two substantially vertically spaced aligned rotors or sprocket-wheels 34A mounted in parallel shafts 34B. The rotors 34A–B rotatably engage a closed-loop tube 36S or endless sequence of continuously and mutually interconnected closable tube segments 36 (FIGS. 7, 8, 10, etc.) substantially submerged in the liquid 4 and defining a substantially vertical rising length 35 terminated top and bottom by arcuate transition lengths in turn connected by a return length to define the closed-loop tube 36S as substantially continuous and confined to continuous cyclic motion around mentioned rotors 34A–B for transducing the buoyancy power of the generative fluid or gas 5 rising therein;

According to this invention the floturbines, are turbines for transducing the buoyancy power of a low density fluid flowing due to buoyancy or pressure received from a higher density fluid trying to occupy the same place. As noticed, for achieving best density differentials, buoyancy can be enhanced by manipulation of temperature of at least one fluid.

The circulating generative fluid can be a liquid, a gas, air or mixture of gases, gas mixed with water vapor (to enhance "touch" in gas turbines), water vapor, ammonia vapor, etc. and it can be better but not essential that the working generative fluid liquefy as the system will work whether it does or not. The generative fluid is gaseous for most if not all the time, it will subsequently be referred also as "gas," "generative fluid", "circulating gas", "working gas" or "working fluid", both in the description and the claims. Numerals 5, 5A or 5B will be used for generative fluid when in gaseous state. Examples of the generative fluid are hexane, water vapor (even buoying in a 100° C. hot liquid), silicon, air, helium, propane, hydrogen, oxygen, carbon dioxide, ammonia, methylene chloride, etc., virtually any fluid compatible with the impelling liquid 4 and materials being used.

The impelling liquid 4 can be water or any liquid as oil, diphenyl, mercury, gasoline, fused salts, etc. that does what water does as described herein, so that the terms liquid and "water" are used both in the description and claims to describe the impelling liquid, the term is meant to encompass all workable liquids. The impelling liquid 4, in this case the liquid within enclosure 82, can be standing as a column in a vessel, basin, etc. or can be flowing in a channel, river, lake, sea, etc. and it is not indispensable to be man-heated. The impelling liquid 4 is "standing" only in the sense that it does not circulate along with the generative fluid, but it could be circulating on its own as part of the heat exchanger function through pipes 75A, pumps 75 (FIG. 7) and the High Temperature Sources (HTS 85 later explained). The impelling liquid 4 may be treated against bio-buildup and may, if receiving a liquefied freezing gas, incorporate a buffer liquid 2 at least within a first injection chamber 19A (better shown by FIG. 4) which receives liquefied gas through port 15.

This very same liquid 4 can be also the generative fluid, but vaporized by any heating devices as heat exchangers, furnaces, etc. in chambers 19 or 40 (FIGS. 7, 8) for manipulating its density. In such case, when the generative fluid is water vapor for flotascesion within hot water and conventional pressure will also be transduced, the heating devices will supply heat additional to the amount needed for the conventional pressure at the beginning just to compensate the pressure of the hot impelling liquid 4 at the port 15; but once the needed pressure is reached, the heat rate amount can be only the amount used to run the conventional water-vapor turbines which would be run even without the liquid, as in conventional thermal transduction. Again, once the pressure for injection into the liquid is reached, the amount of heat can be augmented or diminished according to desired amount of vapor transduced by the floturbines and the conventional turbines.

Water ($H_2O$) as generative fluid may just be condensed and returned to the water ($H_2O$) as standing water 4, and heating devices 19 may just vaporize the water in situ or conveyed through other super-heating sources HTS 85. The temperature of the standing liquid 4, treated to stand temperatures of 100° C. or more without boiling, can be maintained stable using binary or Rankine cycles to extract its heat including sensible floturbines 34–36.

However, the increased pressure within a fully closed chamber 82 will decrease the volume of generative fluid flotascending through the liquid 4; but flotation will not disappear, especially when enough heat is being furnished.

Obviously, the rule is to use as generative fluid any substance to provoke its flotation within the same substance or within a different substance. Air floating within air as in aerostatic balloons would be another example.

Pressurization or at least condensation of generative fluid starts or re-starts downstream the last expansion turbine of the passageway and both, pressurization and condensation, can be cogenerative. However, if the generative fluid is water taken from a high reservoir (as a dam) having enough pressure (head) at port 15, condensation may not be necessary except for producing distilled water downstream transduction.

Figure 3:
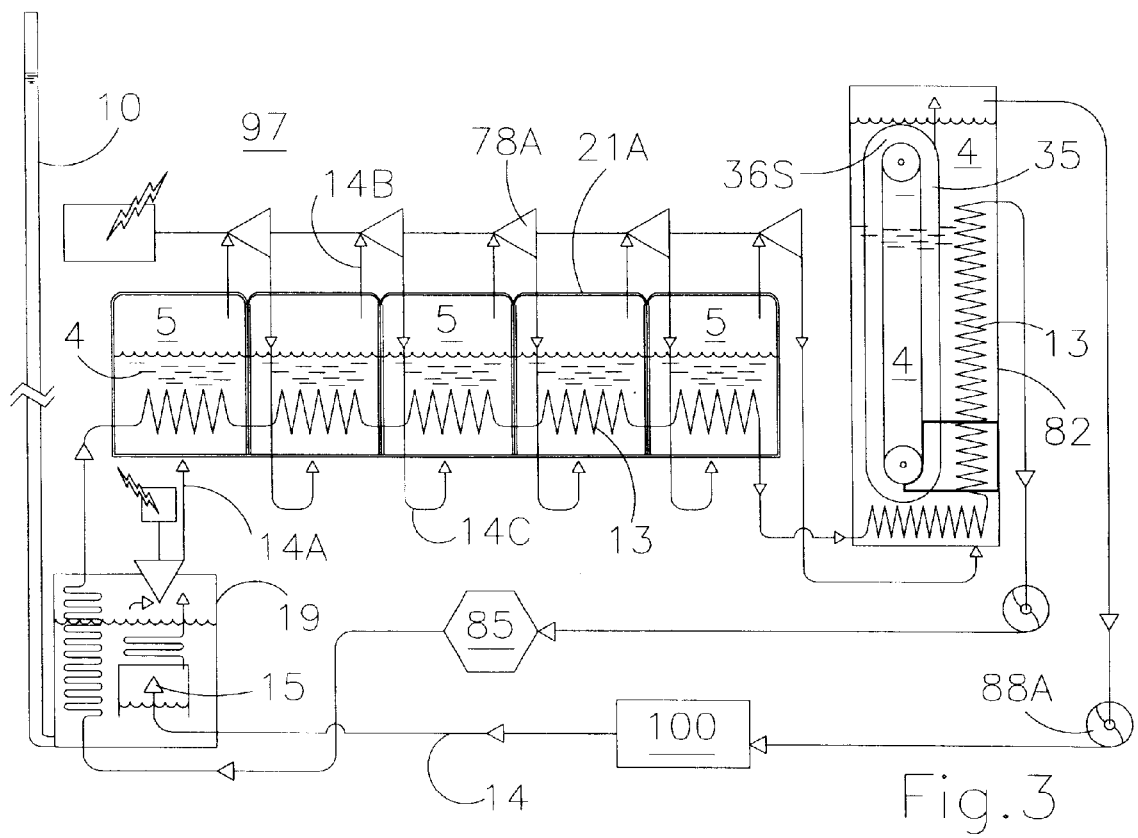
FIG. 3 is a diagrammatic view of the system having a horizontal arrangement of pressure chambers assisted by a Hydro-pressurizing vessel.

Recources causing first or initial flow of the generative fluid are one or more of the motor-driven compressors 88, and 88A of FIG. 3, or even heat pressurizing chambers as chamber upper end 82A of chambers 82, etc. which cause the flow or pressurize the generative fluid 5B for re-injection or at least for condensation downstream sub-aqueous transduction. For condensation-cogenerative-pressurization, embodiments large enough to support energy demand considered high may use at least one combustion turbo-compressor of a turbogenerator or a whole adapted turbojet engine 90 (as GE's 7F, SIEMENS' 84.2, ABB's 11N1 turbo-generators) to drive mentioned compressor 88, (88A, FIG. 3). The turbo jet engine 90 has an air intake corridor 90A defining a flow of air, and heat exchanging devices 92 linked to mentioned corridor 90A for heating up same while cooling the working gas therethrough, and having a conduit 90B for continuous hot exhaust discharge when in use. The hot exhaust is an additional HTS 85 and/or its thrust is the power of a generative fluid for at least one additional floturbine 34–36 or 36S. Compressed and hence at an obvious elevated temperature, the gas starts passing through gas conduit 77A and through the pipe cross sectional reduction valves or conduit reductions 77. The gas volume must be cooled-reduced prior to entering into the heating devices, and the heat thus extracted may be beneficially used in a distillation plant 94, in co-generative binary or Rankine cycle subsystems 98 (even using our sensible floturbines 34–36), in simple domestic heating, etc. In place of or in addition to these heat extracting systems, additional low temperature sources 100, designated as "LTS 100", can be needed directly to further lower the generative fluid temperature. Condensation of generative fluid up to liquid state can be realized just through cooling, as in the case of water vapor condensation. Re-introduction into the heating devices and/or under pressure influence of the liquid can be attained by manipulating the depth of generative fluid in liquid state according to its relative density (FIG. 2A) by using mechanic compressors 88, 88A, by using absorption (as in FIGS. 2B, 2C).

Low Temperature Sources LTS 100 represent any low temperature source for this transducer and could be coldness derived from currents of fluids as in cooling towers 99 (or using even domestic, commercial coolers in place of or in addition to said cooling towers), and natural currents as of wind, of water from sea, lakes, rivers, channels. The condensation can be done downstream and/or upstream the pressurizing devices. The basic importance of the cooling is that It reduces the pressure on the impelling liquid and reduces the volume of the generative fluid and hence the energy required to re-introduce the generative fluid into at least the impelling liquid 4. Embodiments recirculating the generative fluid are benefited by the pressure drop created by the cooling at least since energy investment is reduced, buoyancy is enhanced and also the circulation power of generative fluid through conventional gas turbines when used.

Stretchable chamber 76E is, in this case, a gas cooling and storing chamber assisted for extendibility by a water filled pressurizing vessel 10. The chamber 76E and valve 77B control the flux and the amount of gas, and hence, the speed of turbines being used and assists also in the control of pressure due to amount of generative fluid circulating in the system. Stretchable chamber 76E, due to its storing feature, can store low heat from erratic sources especially when or where no continuous LTS 100 are available. A stretchable chamber (as chamber 76E) also can be used to store heat from peak periods in its inner pressurized fluids. Of course, substantially all chambers and other linking channeling devices are thermally insulated.

These chambers are referred as "stretchable chambers" because pressure and volume of the gas pressurized between the chamber's top and the surface of the inner pressurizing or impelling liquid can be altered. Due to this feature the stretchable chambers can also assist in storing energy excedents as gas constantly pressurized by the liquid either cooled or heated up. This storing feature is especially relevant for running solar-fed systems during the nigth with hot pressurized gas stored during the day. Of course, a solar-fed system can also run on combustion when solar rays are scarce or absent.

Hydro pressurizing vessel 10 assists in this system in maintaining a selected pressure (as atmospheric pressure in chamber 83 FIG. 7) in selected chambers. The pressurizing vessel 10 represents, in these related FIGS. 1, 2, 3, 5, higher pressure at the first chamber and the decreasing of pressure downstream the liquid and/or in the chambers of the passageway which are connected to same vessel 10 by linking pipes 10B (also FIG. 5).

Hydro pressurizing vessel 10, can be a standing pipe or either a huge chimney containing liquid up to a certain level usually higher than the surface of the liquid inside the chamber or chambers assisted. It controllably and substantially substitutes the pressures within open waters. The flux through pressurizing vessel 10 can be regulated and even closed by a valve 10D thus stopping mentioned stretchability. Chamber 76E storage feature is also used at times when storage is necessary to withdraw the generative fluid from circulation for maintenance, etc.

Heating the generative fluid can be performed either before or within the liquid 4 but preferably upstream the floturbine 34–36. For heating the generative fluid, high temperature sources 85 as a thermal buffer zone (later explained), furnaces, heat exchangers, etc. are used. An alternative could also be the use of solar farms (not shown) as those used by "Luz international" in the Mojave desert where the generative fluid would be passed along tubes, each tube heated up by its own heliostate. Of course treated oil can be circulated through mentioned solar farms and the chambers of this energy transducer to heat the gas 5 (in situ). Another alternative is to pass the generative fluid through other solar collecting devices such as solar rafts 95 (shown in FIG. 2E), solar ponds and even more conventional solar collectors. The generative fluid can further be passed through geothermal heat, residual heat, man-made boilers for mentioned water vapor, etc. The heating devices include chambers 19, 22, 40 (FIGS. 7, 8) internal or external to the trap, reservoir, chamber or enclosure 82. Chambers 19, 22, 40 represent boilers, furnaces, heat exchangers, etc.

After the generative fluid has been condensed, it is injected to be energized into chamber 19 or 40 (FIGS. 7, 8) of mentioned heating devices through the port 15 although not necessarily as to immediately touch the standing liquid 4 (to prevent possible freezing of standing liquid 4 as in the case of liquefied fluids having freezing temperature), but into the thermal buffer zone 2, 19A (FIG. 4) prior or within the standing liquid 4 supported, in this case, by the reservoir 82. The thermal buffer zone 2, 19A (later explained) may in such case be included within mentioned heating devices. Obviously these chambers 19, 19A count with valves for the control of fluids and adecuated to their nature.

Figure 5:
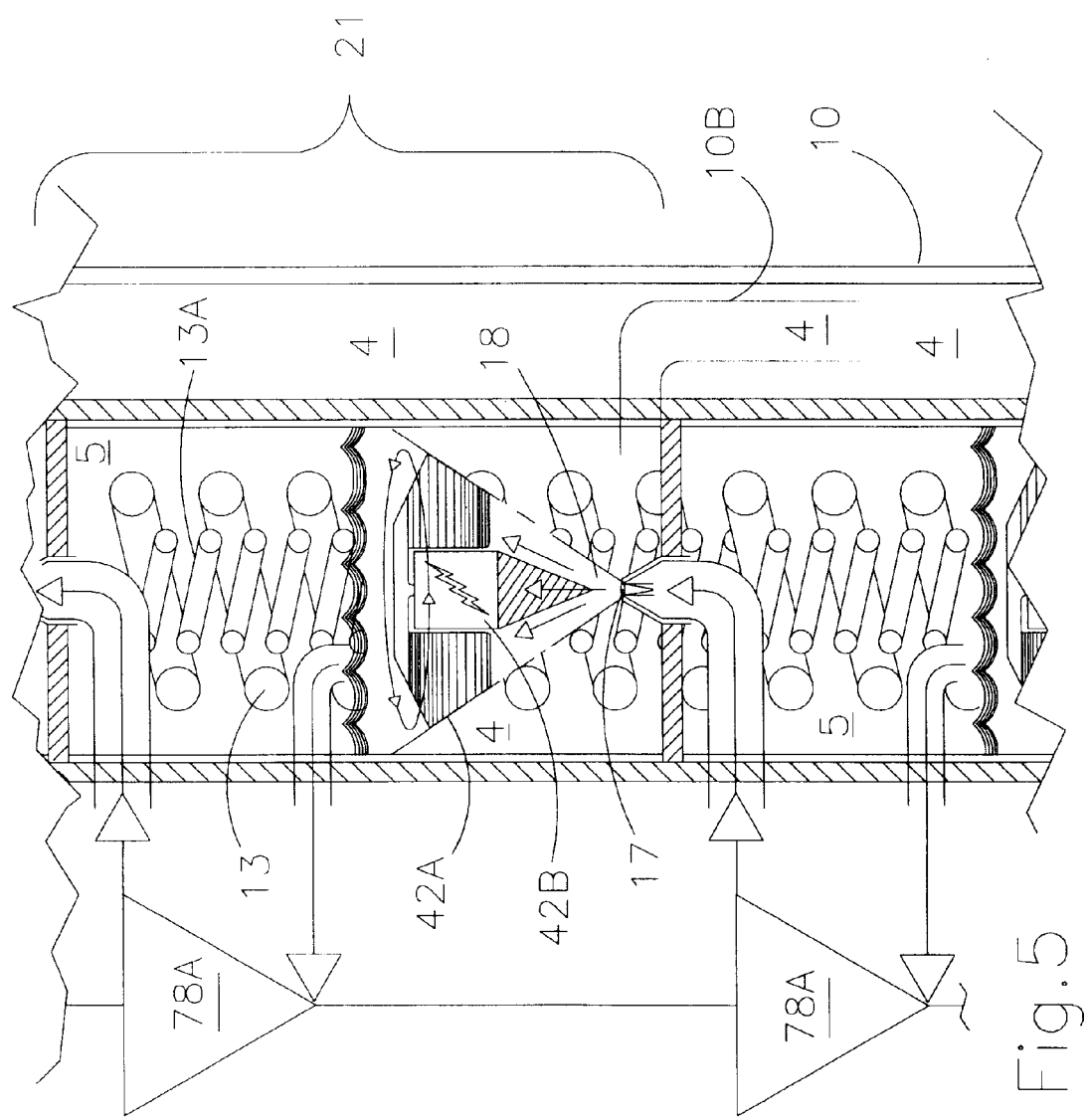
FIG. 5 is an enlarged diagrammatic view of a vortex chamber 21 and conventional pressure differential gas turbines showing the communication recourses.

Also shown by FIGS. 2 and 5, the gasified generative fluid or gas 5 is then conveyed downstream through an optional conventional gas turbine 78 or through a vortex generating nozzle 17 as in chamber 21 (FIG. 5) where the rotational energy of vortex 18 is transduced by vortex turbine blades 42A and generator 42B. The gas then accumulates conventional pressure in the upper part of mentioned vortex chamber 21 from which it passes through conventional gas pressure turbine 78 (FIG. 2), 78A. A series of the chambers 21, representing stages between turbine transduction, can be arranged in a vertical stack as shown in FIG. 1, or in a horizontally distributed array as shown in FIG. 3.

In the preferred embodiment, the gas 5 may be passed through a multisource heat collector 22 (also FIGS. 2, 2B, 2C, 11A–D) as one option, which may receive the heat from mentioned high temperature sources 85, directly or through heat exchanging devices. The collector 22 can be arranged to include the liquid 4 and floturbines (as in FIGS. 2B, 2C). The collector 22 can be positioned horizontally or vertically, and either deployed on ground or water in a sub-surface mode, or over surface level, even floating on a raft.

The gas 5 thus heat-Hydro pressurized, depending on temperature and pressure, may either be conveyed directly to work in the buoyancy harnessing turbine 34–36 or through another pressure differential turbine section 78C on its way to the floturbine 34–36. The heating column 22 (further described for FIGS. 11A–D) is an alternative to the use of the conventional heat exchangers 13 and 13A (FIG. 5). At least in part, column 22 assists in heating-up the working fluids from mentioned high temperature sources HTS 85.

An inlet-hood 38 (clearer in FIG. 10) receives, accumulates-shapes and feeds the generative fluid or gas 5 to the rising length 35 arriving by buoyancy and/or conveyed through linking circulating devices such as pipes 15A from the heating devices. The gas 5 accumulates under the hood 38 forming a sub-aqueous gas pocket, foot and beginning of a substantially vertical gas column enclosed by the rising length 35, powering section of the floturbine 34–36. The hood 38 is a gas accumulator assisted by its anti-spillage devices 38A (also FIG. 8) which are located between the hood 38 and the tube segments 36. Thus, inlet-hood 38 furnishes the floating gas 5 to the vertical rising length 35 which revolves the closed-loop tube 36S.

The gas 5 coming up from floturbine 34–36 may either be released into atmosphere 97 (as shown by FIG. 8) or may be accumulated-pressurized for further processing in a chamber formed between the surface of the water 4 and the top or roof 82A of the chamber 82.

Mentioned further processing can be either: (a) profiting the pressure of gas 5B through a conventional gas pressure turbine 78E–H (as shown in FIGS. 2B, 2E, 7, 8) and cooling the gas downstream or (b) just passing the generative fluid through condensation, preferably co-generative condensation.

Re-circulation can be the most viable option. The pressurized gas 5B can be simply cooled as shown in FIG. 2A and re-circulated as liquefied gas 5D. Using upper gas pressure, gravity and having an adecuated depth in the pipe 14 the liquefied generative fluid can be exposed to the heating devices by its own weight. Check valves can be used as another devices to prevent flow-back of generative fluid. Pressure is the same above liquid 4 and above liquid generative fluid 5D. For re-circulation, other embodiments as in FIG. 7, use compressor 88B in tandem with a pressure turbine 78E or, as in FIGS. 1, 2, can use compressors 88 driven by motors or combustion turbo-compressors, that is the conventional adapted turbo-jet engines 90 with or without their usual turbines. A third option for further processing would be the re-injection by absorption as in FIGS. 2B and 2C.

FIG. 2 shows a modification of FIG. 1 wherein the turbines 78B are each located in a different chamber 82C divided in pressurized segments for each turbine that transduces the pressure of gas 5A spilled by the closed tube segments 36 while rising within the liquid 4. Other embodiments do not segment column 82C and accumulate spilled gas 5A against one upper turbine 78B.

Also, as shown by FIG. 2, in a solar-enhanced embodiment the heat collector 22 is also a solar collector for receiving heat from sources above mentioned. Multi-source heat collector 22 will receive heat not only from geothermal, combustion, residual heat, etc., but when positioned above surface also directly from sun beams 30 through a double walled transparent insulating shelter 28 and reflected by heliostats 32A and 32B.

Multi source heat collector 22, further defined in FIGS. 11A–D, shows its over-surface appearance covered by double-walled transparent insulating shelter 28, zigzagged for better reception of solar rays 30 reflected by heliostats 32A and 32B. In this embodiment, a conventional turbine 78C transduces the pressure that the collector 22 accumulates at its upper end portion.

Figure 2D:
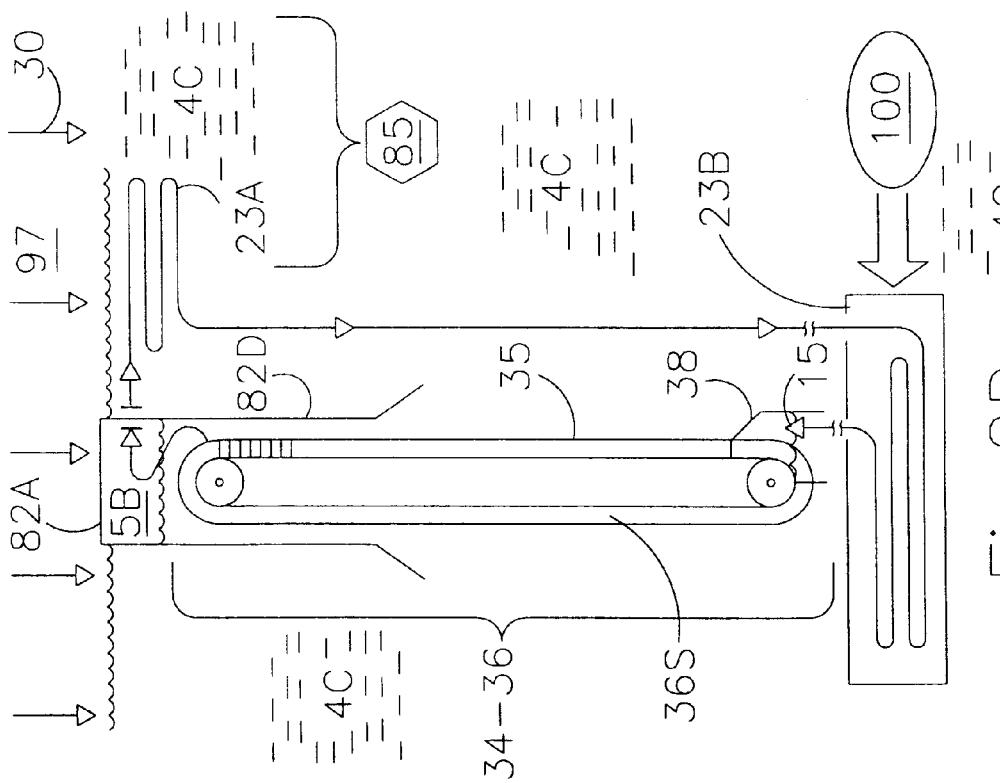
FIG. 2D is a diagrammatic view of the system showing a floturbine and an inverted hopper partially enclosing same, both substantially submerged.

Pressurizing vessel 10 in this case not connected to chamber 19, flexibly controls pressure inside the chamber 82, assisted by liquid spillage gates 10A which allow enclosure 82 to accumulate heat-pressurized gas 5B (as in FIG. 7) controllably manipulating the buoyancy pressures inside enclosure 82, without significantly increasing pressure at the port 38, resembling an open bottom enclosure 82 submerged in a wider body of water as in FIGS. 2D, 7, 8.

FIG. 2A is clearly an embodiment having injection by gravity-flow wherein downstream floturbine 34–36 the gasified circulating generative fluid 5B, pressurized within chamber 81 principally by heat and accumulation up to a selected point, flows through optional conventional turbo generator (not shown). A condensing chamber 84 converts the pressurized generative fluid 5B into a liquefied generative fluid 5D. The level or height of liquefied generative fluid 5D is decided basically relying on the specific gravity of the generative fluid and required flow speed as to perform substantial costless reinjection of the liquefied generative fluid 5D. Due to the increasing depth of the accumulated liquefied generative fluid 5D in the erected portion of duct 14, increased hydrostatic pressure is accumulated by the liquefied fluid 5D at the heating devices. In the case that for any circumstances the generative fluid 5D does not accumulate enough pressure by its own depth, obvious almost costless pumping of the generative fluid 5D can be used for re-circulation. Should the generative fluid be the same as the standing liquid 4 (as in the case of water), an alternative could be just to return the generative fluid 5D to the standing liquid 4.

As shown by FIG. 2B, injection by absorption in a simple method is used where two miscible fluids are used; the circulating fluid can be a low boiling point liquid as ammonia and the standing fluid 4 can be water and more exactly weak ammonia liquor. The mixture of ammonia and water (ammonia liquor) is heated, in this case, by heat exchanger 13 in container 82G. The ammonia being more volatile than the water, rises in the water by buoyancy gradually expanding according to heat and gradually less hydrostatic pressure. The hood 38 traps an directs volatized gaseous ammonia 5 into mentioned vertical rising length 35 thus rotating by its buoyancy the closed-loop tube 36S. Subsequently, the gaseous ammonia 5 is directed through gas expansion turbine 78H and condenser-absorber 53 which contains ammonia liquor 4A that has arrived there impelled by one or more pumps 55 from the boiler chamber 82G via a heat exchanger 57. In condenser-absorber 53 the ammonia is absorbed into mentioned liquor 4A and the strong liquor 4B thus formed is conveyed for re-circulation toward the boiler chamber 82G through the heat exchanger 57 where it draws some of the heat from the weak liquor 4A passing through.

FIG. 2B also shows the floturbine 34–36 inside a Multi-source heat collecting chamber 22 positioned above surface to receive solar rays 30 through its zigzagged transparent shelter 28. For such embodiment, a single metallic tube substitutes the concentric tubes of chamber 22 (further explained for FIGS. 11A–D).

Shown by FIG. 2C, another embodiment would be about the same as for FIG. 2B, except that between container 22 and mentioned absorber 53 is interposed a pressurized condenser 86 and one or more evaporators 87, obviously for refrigeration purposes, thus adding more usefulness to this energy converter. The pressurized gaseous ammonia 5B from pressurized condenser 86 liquefies in same and expands through expansion valve 77A thus entering evaporator 87 where pressure is significantly reduced by its connection to the absorber 53 and liquid ammonia evaporates thus drawing heat from its surroundings. At least this example describes how low temperature of the generative fluid in any embodiment can be used for refrigeration while being gradually heated before its injection into the liquid 4 and/or its subjection to sources of higher temperature, even if the generative fluid is not ammonia. Into the absorber 53 the circulating gas 5, this time working as gaseous ammonia, is absorbed by mentioned weak ammonia liquor 4A thus continuing the cycle explained in FIG. 2B.

FIG. 2D shows a floturbine 34–36 in open waters 4C, suitable for OTEC. The gas 5 rising from condensation 23B enters non-man heated liquid 4C (preferably of relatively slow currents) gathers heat from upper layers of water 4C and conductivity of tube segments 36 (this time made of thermally conductive material), expands, buoys and powers the floturbine 34–36 which is enclosed by open-bottom chamber 82D to control and pressurize the gas 5 after exiting floturbine 34–36. The pressurized gas 5B, at least for reinjection, can be further heat-pressurized between the surface of the column of standing water and the roof 82A of hood 82D by using any heat through inner heat exchanger (not shown) similar to those of FIG. 7. From mentioned upper-inner pressurization, the gas 5 is conveyed and further heat-pressurized through heat exchanger 23A heated by hot surface water 4C, toward condensing zone heat exchanger 23B, cooled by lower cold waters, for its condensation and reintroduction into the floturbine 34–36. For times when pressure for injection into the hood 38 is low, an impelling device (not shown) can be added at the end of the condensing pipe to assist for introduction of generative fluid into the floturbine 34–36. The difference in density and the hotter layer of liquid at the injection level will buoy up the gas 5. In other very elemental embodiment, a mechanic compressor (not shown) can be used to assist in condensation of generative fluid being injected into the impelling liquid 4C after its condensation through the cooling devices 23B.

FIG. 2E shows a floturbine 34–36 also for open water suitable for OTEC, enclosed by buoyant chamber 82F suspended from a buoyant solar raft 95 as one of the high temperature sources which can be assisting this embodiment. Some embodiments can use adapted ships (not shown) to substitute the solar raft 95 and the complete structure can be relatively hold in place by surface and/or bottom anchoring devices as attachments 95F or any other kind of suitable relatively flexible attachment according to conditions of the location (on the ocean, on a dam, etc.). This design uses a fluid like ammonia as the working fluid. A heat transferring fluid like treated oil is heated up within heat-exchanging pipes 95A and, using pumps 95B, conveyed throughout enclosure 82F to heat up fluids within same and re-circulated to mentioned solar raft 95. Solar raft 95 can gather the heat from several heat sources as surface water, geothermal and from the sun (and from combustion when needed) and accumulate mentioned heat mainly in a suitable heat transferring bed 95C. After exit from floturbine 34–36, gas 5B is further heat pressurized at the top of the container 82F and optionally within surface hot waters 4C in heat exchanging pipes 23C, subsequent to which gas turbo generator 78G produces usable additional energy. The generative fluid is then condensed with cold water from lower temperature layers in condenser 23D and injected with optional assistance of pumps 91 into the expanding phase to be re-heated and recirculated. Absolute pressure diminishes gas expansion within the impelling liquid when floturbines are completely enclosed due to this conventional upper inner pressurization especially if no additional heat is supplied to the rising gas 5. This can be overcame by supplying additional heat to the Hydro-pressurized just injected gas 5 and/or by using vaccum pumps downstream the conventional turbine 78G.

FIG. 3 shows a horizontal arrangement of chambers, the first injection chamber 19 having the highest pressure due at least to influence of Hydro-pressurizing vessel 10. Horizontally, but similar to chambers 21 of FIGS. 1, 5, each chamber 21A has one or more turbines 78A preferably connected in tandem and with generators. Mentioned chambers 21A can generate vortex power, as shown by FIG. 5 and of course, all chambers 21A can have an inner floturbine. All chambers 21A are heated up by HTS 85 through heat exchangers 13. From condensation by condensing devices (implied, not shown) operationally connected to the LTS 100, the generative fluid is conveyed by linking circulation devices as pipes 14, 14A–C. The generative fluid is progressively heat-pressurized in each chamber and expanded through turbo generators 78A and through closed-loop tube 36S of floturbine 34–36 after which it is pressurized by compressor section 88A for condensation and reinjection through port 15. Obviously, condensation may start before compressor section 88A.

Figure 4:
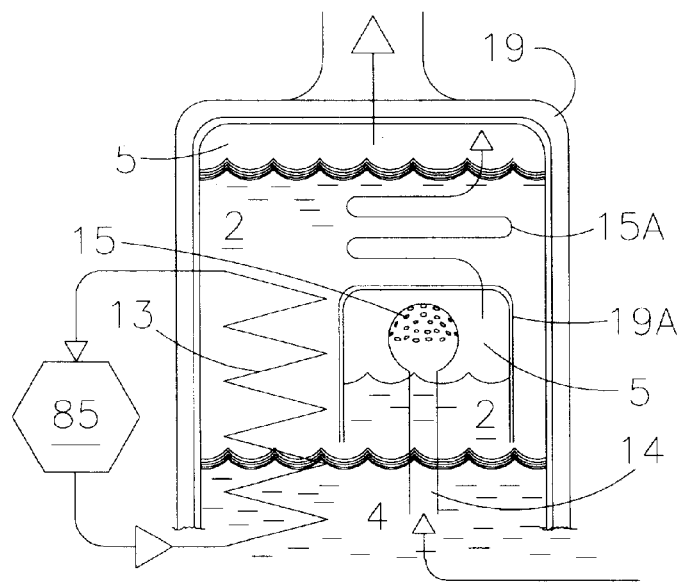
FIG. 4 is a diagrammatic view of a pre-heating first injection chamber and port region.

FIG. 4 shows an option for heat-energization of generative fluid (similar to heat energization shown in FIG. 2) where pressure of liquid 4 is included within heating chamber 19 and pressurizes a freeze resistant or an anti-freezing thermal buffer liquid 2 (as oil) and the generative fluid against the top of the chambers 19, 19A. Heat exchanger 13, conveying hot fluids from high temperature sources 85 heat up the inner fluids. This buffer liquid 2 (such as treated oil maintained hot) is high heat transferring, has a freezing point lower than the liquid 4 (especially if this is water) and, maintained in a buffer zone 2, 19A, permits the generative fluid to warm before contacting the standing water or liquid 4 so that the coldness from generative fluid just injected does not freeze the standing water or liquid 4. The generative fluid is introduced or allowed to the heating devices through port 15, in this case immediately within the gas spreading chamber 19A set within or before (also FIGS. 1, 2, etc.) the buffer liquid 2. The generative fluid is then conveyed by sinuous heat exchanging pipes 15A through the buffer liquid 2 and the standing liquid 4 (even as far as the inlet-hood 38) at least for longer and better heat exchange. Subsequently, after revolving the floturbine 34–36, the generative fluid 5 is pressurized against the top of chambers 19 for conveyance through linking circulation devices to at least one turbo generator (as shown also by FIGS. 1, 2, 3 #78s). Channeled by mentioned pipes 15A, the generative fluid can be additionally heated out of the chambers 19 and 82.

Figure 6:
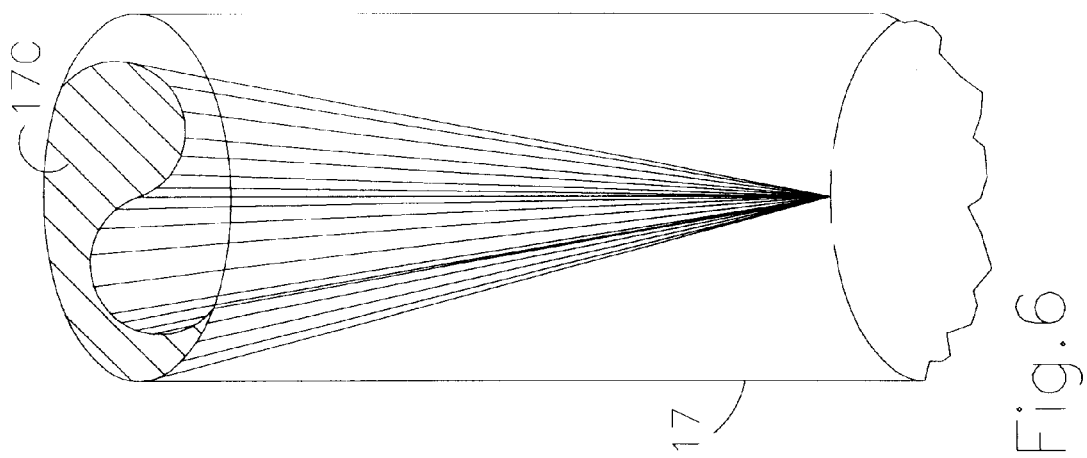
FIG. 6 is a diagram of a gas nozzle and inner cone for creating a vortex.

FIGS. 5 and 6 show a sub-aqueous vortex sub-system having a chamber 21, one of several vertically aligned chambers (which can be horizontally aligned as in FIG. 3) forming a column whose inner liquid 4 and gas 5 are heated by heat exchangers 13, 13A. This chamber 21 receives the gas 5 through a nozzle 17 assisted in this case by a helical cone 17C (of FIG. 6) at its outlet for shaping sub-aqueous helical buoyancy (buoyancy plus rotation of generative fluid ) and hence a vortex 18 while ejecting the gas 5. Other embodiments may use several openings, nozzles or the like with no helicoidal cone 17C, but aligned and directed to form or shape the same vortex 18. The spin power of vortex 18, is harnessed by turbine 42A operatively connected at least by a shaft to a generator (not shown) and may be connected in tandem to other vortex turbines and generators. An extended portion of the shaft is hold by bearings attached to a supporting structure (not shown) although this supporting function can be achieved in several different ways. Vortex chambers 21 can be assisted by other chambers similar to first injection chamber 19 of FIG. 2. For transducing also the power of the gas 5 pressurized at the upper portion of the chambers 21, the gas can be conveyed through a conventional gas pressure turbine 78A into the next vortex turbine 42A and chamber 21 or into chamber 22 (FIGS. 1, 2) or directly into the floturbine 34–36. Chamber 21 also can be a stretchable chamber if assisted by the water-filled pressurizing pipe 10.

FIG. 7 shows a floturbine submerged within an open bottom chamber or reservoir 82E which is, in turn submerged in water 4C of a basin or a container. Also represented is a chamber heat exchanger 40 to heat the generative fluid just injected via pipe 14. A pump 75 continuously re-circulates the "standing" liquid 4 through channeling pipes 75A to be heated by any of the mentioned HTS 85, and reinjects same at lowest level of chamber 40.

FIG. 7 also shows an option where the gas 5, further heat-pressurized against the roof 82A of the enclosing chamber 82E, is released to at least partial condensation (not shown) and atmospheric pressure inside stretchable chamber 83 and LTS 100 through turbo generating devices 78E in tandem with a compressor section 88B. Compressor 88B assisted by LTS 100 re-injects condensed generative fluid into chambers 40, 82. Downstream the floturbine, the stretchable chamber 83 permits the drop of pressure while preventing waste of gas and waste of heat. At least one set of conveying rollers 51 and their hydraulic movers 51A (also), attached to mentioned support structure, assist to maintain in smooth equilibrium the movement of the closed-loop tube 36S. A hot fluid is continuously recirculated via pipes 13B between HTS 85 and chambers 40 and 82E.

FIG. 8 shows a perspective of the floturbine 34–36 and lower heat exchanging chamber 40. It shows also the floturbine 34–36 partially enclosed by the chamber 82E which resembles a main hood or inverted hopper. Pressurized, the generative fluid enters through pipes 14 and nozzles 15, it rises circuitously through heat exchanging chamber 40 and becomes heat-expanded. The expanded generative fluid 5 continues rising to form the gas pocket under hood 38 which is assisted by anti-spilling devices 38A and forms the foot and beginning of the gas column contained in the vertical rising length 35. The hood 38 may have an adjustable opening 40A if needed for spilling gas 5A, which is captured by hoods 76B and harnessed by conventional turbines 78B. When gates 46 (FIG. 9A) are closed from the inlet hood 38, according to this embodiment the vents 36G of the rising tube segments 36 will vent the gas 5A whose buoyancy is transduced by the conventional gas/vapor pressure turbines 78B assisted by their inherent channelling devices or hoods 76B. Once above the liquid 4 and pressurized against the top 82A, the circulating gas 5B will further generate energy through turbine 78F while released into atmosphere 97. Air compressors (not shown) assisted by LTS 100 re-inject preferably cooled air from atmosphere 97.

FIG. 9A shows an alternative way for locating the vents 36G at the front of the tube segment 36 just adjacent to louver gates 46.

FIG. 98 shows an alternative way for locating the vents 36G between the front and back edges of the tube segment 36 just adjacent to louver gates 46.

FIG. 10 shows the lower rotor 34A–B which can be basically formed by rotating crossed beams, cylinders, or, as in the preferred embodiment, by sprocket wheels 34A in turn mounted in parallel axes 34B. Each rotor 34A–B is also a rotational energy connecting element mounted on a frame having at least one supporting column (other embodiments will have at least two supporting walls, like those build in tandem) all together forming the support structure of the closed-loop tube 36S (FIGS. 1, 2, 3, etc.). The support structure and the closed-loop tube 36S thus in turn define the floturbine 34–36.

The closable tube segments 36 mate hinged mutually and coplanarily and are mounted by their inner side on the rotors 34A–B. The tube segments 36 have gates 46 which may be closed near the upper end of the rising length 35 (as shown by FIGS. 2A–E), or as in this embodiment, before leaving the inlet hood 38 (also shown by FIGS. 2, 7, 8). In the first case there is a continuous open plenum defined by the rising length 35 closed only at its upper portion, whereas in the second case each segment of the vertical rising length 35 is a closed-gate separate compartment with its own separate charge of gas 5. In this second case it is more notorious the gas 5 further expansion as it rises in the water, especially if tube segments 36 are full at hood 38 since will spill gas 5A through vents 36G (FIG. 8, 9A–B) set in the walls of mentioned closable tube segments 36. In embodiments for this second case, the flotascensional power of spilled gas 5A is captured by secondary channelling hoods 76B and transduced by turbines 78B (FIGS. 1, 2, 7, 8).

FIG. 10 also shows the tube segments 36 turning at the lower rotor, where they continuously replace each other to enclose a column of circulating gas 5 begining at hood 38. This column in turn powers them upwardly with its buoyancy when the tube segments 36 close the louver gates 46. It is shown as an option, how louver gates 46 can be pivotally closed by cam 64A which actuates exclusively mechanic devices. It is also shown how tube segments 36 leave behind the standing water 4, enter sub-aqueous gas pocket in hood 38 and enclose the column of gas 5 that begins in mentioned gas pocket 38. Sealing devices 38A partially shown, assist to prevent non-planned gas spillage.

Figure 11D:
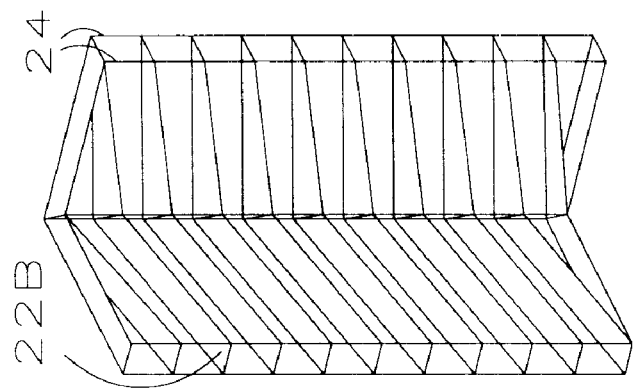
Figure 11C:
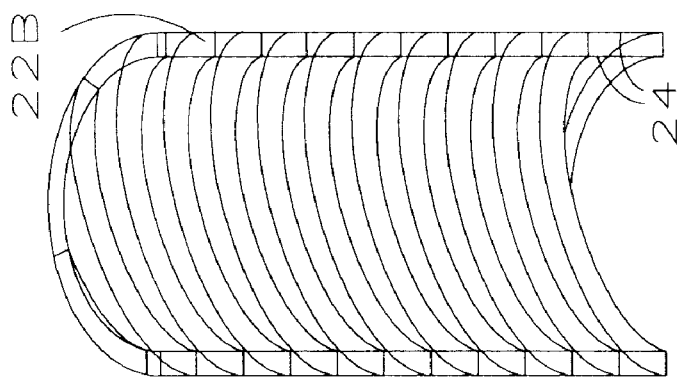
Figure 11B:
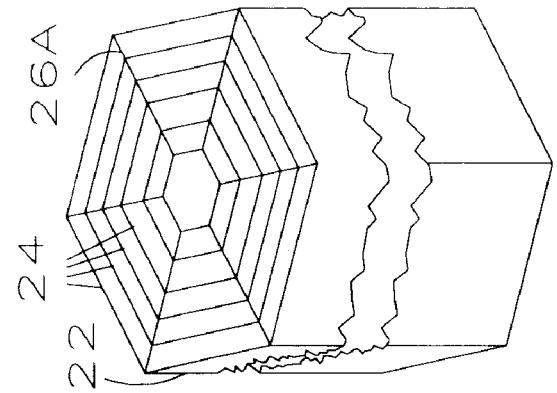
Figure 11A:
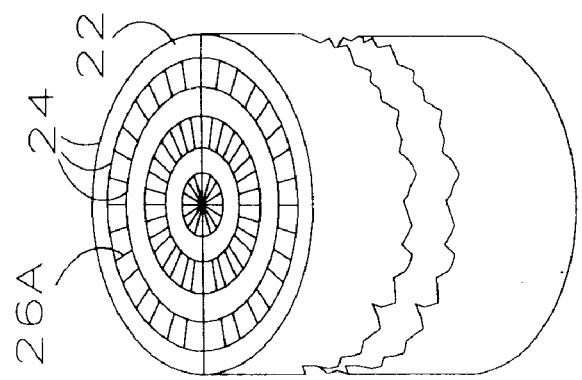

FIGS. 11A and FIG. 11B are two options of a multi source heat collector column 22 which also can function as stretchable chambers to pressurize the gas 5 between the surface of an inner fluid and the top of the column 22. Column 22 consists of an arrangement of concentric tubes 24 separated by slats 26A parallel to the orientation of the concentric tubes 24. In some other embodiments the concenctric tubes 24 of collector 22 are separated by helicoidal slats 22B (FIG. 11C). The slats make possible to convey several kinds of hot fluids through the channels or sub-ducts thus formed preferably in countercurrent to the generative fluid 5. Also shown by FIG. 2, this multi source heat collector column 22 can be used under surface or on the surface of ground or water. When above-surface, the outermost tube wall side is coated with a black film for solar absorption and is surrounded by mentioned double walled transparent insulating shelter 28.

FIGS. 11C and FIG. 11D show sections of two concentric tubes 24 having coiled slats 22B in between. To build up the two complete concentric tubes 24, these sections of concentric tubes must be united with other similar sections or complementary parts.

As in the foregoing construction any changes, adaptations and different arrangements can be made without leaving the principles, objectives or intentions here exposed, it is applicant's desire to make clear that all descripted material, text and drawings should be interpreted only as illustrative and not with limitatory character, particularly as defined in the following claims.

What is claimed is:

1. A method for transducing the buoyancy of a one way circulating generative fluid flowing in a passageway essentially having means producing fluid flow including heating means and an impelling liquid, controlling-directing means and at least one device selected from the group consisting of a gas/vapor conventional turbine and a floturbine of vented closable tube segments for transducing buoyancy power of the circulating generative fluid impelled by the liquid, said floturbine basically consisting of a closed-loop tube defining an internal plenum, a support structure including at least one upper and one lower rotors rotatably engaging said closed-loop tube thereon such that same defines a substantially vertical rising length terminated top and bottom by arcuate transition lengths in turn connected by a return length to define said closed-loop tube as substantially continuous and confined to a continuous cyclic path and motion around said rotors, said closed-loop tube as mounted on said support structure defining an inner side engaging said rotors and being defined by an endless sequence of closable tube segments, each tube segment having vents for spilling generative fluid, and having at least one gate with an open mode and a closed mode in which it closes off said internal plenum;

motive means for selectively opening and closing said at least one gate as a function of the position of the respective gate in said cyclic path such that there is always at least one closed gate in the harnessing length to capture buoyant gas for driving the tube around said cyclic path and to generate useful energy; and chamber means for directing-feeding the generative fluid to the floturbine;

said method comprising the steps of:

(a) producing flow of the generative fluid in the passageway;

(b) exposing the generative fluid to said heating means;

(c) controlling-directing the heated generative fluid; and (d) transducing the buoyancy power of the generative fluid impelled by the liquid by using the device selected from the group.

2. The method of claim 1 wherein said passageway includes a vortex sub-system essentially having means for generating helical buoyancy or vortex's buoyancy-plus-rotation of pressurized generative fluid within the liquid and a vortex turbine basically consisting of a support structure rotatably holding a shaft and a plurality of blades fixed to said shaft, and further including the method steps of (a) generating helical buoyancy of generative fluid within the liquid;

(b) transducing the helical buoyancy using said vortex turbine.

3. The method of claim 1 wherein the device selected from the group is the floturbine and in further combination with the method step of (a) releasing the hot generative fluid from the floturbine;

(b) accumulating and pressurizing the released hot generative fluid between a hood or chamber and the liquid;

(c) using the accumulated and pressurized generative fluid for rotating at least one gas/vapor conventional turbine.

4. The method of claim 1 in further combination with the method step of:

at least before step (a), but before step (b), condensing the generative fluid.

5. The method of claim 1 in further combination with the method step of:

after step (a) and before step (b), condensing the generative fluid.

6. The method of claim 1 wherein at least part of the producing flow of generative fluid is done by absorving the generative fluid into the liquid.

7. The method of claim 1 wherein said impelling liquid is light ammonia liquor, the generative fluid is ammonia and in further combination with the method step of absorbing ammonia into the light ammonia liquor.

8. A system including at least one floturbine of closable tube segments for converting into usable energy the buoyancy power of a one way flowing generative fluid impelled by a liquid part of an energy passageway, the floturbine comprising:

(a) means for producing first-fluid-flow, (b) means for heating essentially the generative fluid, (c) controlling-directing means for channelling-shaping a flow of hot generative fluid, and (d) said floturbine substantially submerged in the liquid for transducing buoyancy power of the generative fluid rising therein and basically consisting of a closed-loop tube defining an internal plenum;

a support structure including at least one upper and one lower rotors rotatably engaging said closed-loop tube thereon such that same defines a substantially vertical rising length terminated top and bottom by arcuate transition lengths in turn connected by a return length to define said closed-loop tube as substantially continuous and confined to a continuous cyclic path and motion around said rotors;

said closed-loop tube as mounted on said support structure defining an inner side engaging said rotors and being defined by an endless sequence of closable tube segments;

each tube segment having vents for spilling generative fluid, and having at least one gate with an open mode and a closed mode in which it closes off said internal plenum;

motive means for selectively opening and closing said at least one gate as a function of the position of the respective gate in said cyclic path such that there is always at least one closed gate in said vertical rising length to capture buoyant gas for driving the tube around said cyclic path and generate useful energy; and chamber means for directing-feeding the generative fluid to the floturbine;

whereby the means producing first-fluid-flow drive the generative fluid through the means for heating, the controlling-directing means and the liquid where the buoyancy pressure generated is transduced by said at least one floturbine.

9. The system according to claim 8, wherein said controlling-directing means include (a) at least one capturing chamber having the liquid as a wall for accumulating pressure of hot generative-fluid released by the tube segments, (b) at least one device selected from the group consisting of a vortex subsystem and a gas/vapor conventional turbine for transducing the pressure from said at least one capturing chamber, said subsystem including means for generating sub-aqueous helical buoyancy or vortex's buoyancy-plus-rotation of generative fluid within the liquid and a vortex turbine essentially consisting of a support structure holding a shaft, and a plurality of blades fixed to said shaft and disposed for harnessing said helical buoyancy.

10. The system according to claim 8 wherein the means producing first-fluid-flow is an adapted turbo-jet engine or combustion turbo-compressor directing the thrust and heat of its exhaust gases for driving said at least one floturbine.

11. The system according to claim 8 and further including means for generating a vortex of helical buoyancy or buoyancy-plus-rotation of generative fluid within the liquid and at least one vortex turbine for transducing the power of the helical buoyancy, said vortex turbine basically consisting of
 a support structure holding a shaft,
 a plurality of blades fixed to said shaft and positioned substantially vertical as to be rotated by said buoyancy-plus-rotation,
whereby pressure of generative fluid originates said buoyancy-plus-rotation through the means for generating the vortex of helical buoyancy and said at least one vortex turbine transduces said helical buoyancy.

12. A transducing system including a floturbine for converting into usable energy the power from buoyancy of a one way flowing generative fluid impelled by a substantially standing liquid part of a passageway, said floturbine comprising:
 (a) a closed-loop tube defining an internal plenum;
 (b) a support structure including at least one upper and one lower rotors rotatably engaging said closed-loop tube thereon such that same defines a substantially vertical rising length terminated top and bottom by arcuate transition lengths in turn connected by a return length to define said closed-loop tube as substantially continuous and confined to a continuous cyclic path and motion around said rotors;
 (c) said closed-loop tube as mounted on said support structure defining an inner side engaging said rotors and being defined by an endless sequence of closable tube segments;
 (d) each tube segment having vents for spilling generative fluid, and having at least one gate with an open mode and a closed mode in which it closes off said internal plenum;
 (e) motive means for selectively opening and closing said at least one gate as a function of the position of the respective gate in said cyclic path such that there is always at least one closed gate in said vertical rising length to capture buoyant gas for driving the tube around said cyclic path; and
 (f) chamber means for directing-feeding the generative fluid to the floturbine;
whereby the buoyancy power of said generative fluid fills said rising length and at least one of said closable tube segments closes its gates capturing said buoyancy power venting expanded generative fluid and revolving the tube in said continuous cyclic path and motion around said rotors.

13. The system according to claim 12 including substantially non-frictional means for providing stabilization and smoothness to the cyclic movement of the closed-loop tube.

14. The system according to claim 12 and further including first impelling means, condensing means, heating means and directing means essentially for activating and controlling the generative fluid through the passageway.

15. The system according to claim 14 wherein the directing means include means for capturing and accumulating pressure of hot generative fluid released by the closable tube segments and further including at least one conventional gas/vapor turbine for transducing the accumulated pressure.

16. The system according to claim 14 wherein the first impelling means include at least one mechanical impeller connected in tandem with a gas/vapor turbine.

17. The system according to claim 16 wherein the condensing means include at least one Rankine or binary cycle.

18. The system according to claim 16 wherein the first impelling means include a mechanical impeller rotated by a combustion turbo-compressor or adapted turbo-jet engine for driving the generative fluid through said passageway.

19. The system according to claim 16 wherein the impelling means are defined by an adapted turbo-jet engine or combustion turbo-compressor and the exhaust of the adapted turbo-jet engine is the generative fluid of additional floturbines.

20. The system according to claim 16 wherein said directing means include a stretchable chamber for storing the generative fluid under pressure, said stretchable chamber basically consisting of a first chamber operatively connected to a second chamber both having liquid, whereby the first chamber stores at its upper portion a fluid lighter than the liquid thus pushing the liquid upwardly in the second chamber.

21. The system according to claim 16 wherein said heating means include a multi-source heat collector for heating the generative fluid essentially consisting of:
 (a) concentric heat-transferring ducts separated by slats defining first spaces to flow at least one heating fluid for transferring heat and second spaces adjacent to the first spaces for flowing the generative fluid;
 (b) a zig-zaged transparent shelter enclosing the concentric ducts for solar reception and thermal insulation of same.

22. The system according to claim 16 wherein the passageway includes an atmospheric pressure section or the atmosphere for pressure drop of the generative fluid.

23. The system according to claim 16 wherein the passageway includes means for pressure drop of the generative fluid.

24. The system according to claim 16 wherein the generative fluid is an absorbable fluid and the liquid is an absorbent fluid and further including means for absorving the generative fluid into the liquid.

25. The system according to claim 16 wherein said heating means include pre-heating means for gradual temperature elevation of generative fluid through cooling in a refrigeration process.

26. A system for transducing the power of a one way flowing generative fluid accumulated and pressurized between a liquid surface and the upper portion of a capturing chamber having an inlet and an outlet, said system comprising:
 (a) means for impelling the generative fluid toward and into said capturing chamber;
 (b) at said outlet, a pressure transducing device selected from the group consisting of at least one gas/vapor conventional turbine and a vortex sub-system, said vortex sub-system basically consisting of
  means for generating helical buoyancy or vortex's buoyancy-plus-rotation of pressurized generative fluid within the liquid; and
  a sub-aqueous vortex turbine essentially having a shaft and a plurality of blades fixed to said shaft and disposed for harnessing the vortex's helical buoyancy;
 (c) means for heating the generative fluid in the way to the device selected from the group.

27. A system for transducing the power of a one way flowing generative fluid rising within a liquid and the pressure of the generative fluid accumulated and pressurized between said liquid and the upper portion of at least one capturing chamber, said system comprising:

(a) a floturbine for harnessing the buoyancy of rising generative fluid impelled by the liquid; said floturbine basically consisting of a closed-loop tube defining an internal plenum, a support structure including at least one upper and one lower rotors rotatably engaging said closed-loop tube thereon such that same defines a substantially vertical rising length terminated top and bottom by arcuate transition lengths in turn connected by a return length to define said closed-loop tube as substantially continuous and confined to a continuous cyclic path and motion around said rotors, said closed-loop tube as mounted on said support structure defining an inner side engaging said rotors and being defined by an endless sequence of closable tube segments, each tube segment having vents for spilling generative fluid, and having at least one gate with an open mode and a closed mode in which it closes off said internal plenum, and motive means for selectively opening and closing said at least one gate as a function of the position of the respective gate in said cyclic path such that there is always at least one closed gate in the harnessing length to capture buoyant gas for driving the tube around said cyclic path and to generate useful energy, (b) at least one gas/vapor turbine for transducing the pressure of generative fluid accumulated within said at least one capturing chamber; and (c) means for introducing the generative fluid into the liquid defined by at least one device selected from the group consisting of mechanical pressurizing means, means for absorbing the generative fluid into the liquid, heating means and pressure from weight of the generative fluid in liquid state.

* * * * *